(12) United States Patent
Hara et al.

(10) Patent No.: US 6,408,108 B2
(45) Date of Patent: *Jun. 18, 2002

(54) IMAGE PROCESSING APPARATUS

(75) Inventors: Yoshikazu Hara; Masahiro Nishihata; Yoshikazu Murayama, all of Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/749,881

(22) Filed: Dec. 29, 2000

Related U.S. Application Data

(63) Continuation of application No. 09/106,766, filed on Jun. 30, 1998.

(30) Foreign Application Priority Data

Jul. 3, 1997 (JP) .............................................. 9-177485

(51) Int. Cl.[7] ................................................. G06K 9/32
(52) U.S. Cl. ..................................................... 382/299
(58) Field of Search ................................. 382/298, 299, 382/300, 254; 358/516, 518, 519, 530, 463, 537, 538, 445; 345/538

(56) References Cited

U.S. PATENT DOCUMENTS

| 4,236,809 A | * | 12/1980 | Kermisch | 355/4 |
| 4,829,370 A | | 5/1989 | Mayne et al. | 358/537 |
| 4,929,979 A | * | 5/1990 | Kimoto et al. | 355/38 |
| 4,937,662 A | * | 6/1990 | Matsunawa et al. | 358/75 |
| 5,258,854 A | | 11/1993 | Eschbach | 358/445 |
| 5,287,174 A | * | 2/1994 | Iizuka et al. | 348/624 |
| 5,357,354 A | * | 10/1994 | Matsunawa et al. | 358/530 |
| 5,508,823 A | * | 4/1996 | Kiyohara et al. | 358/463 |
| 5,555,557 A | | 9/1996 | Mailloux | 382/299 |
| RE36,145 E | * | 3/1999 | DeAguiar et al. | 345/511 |

OTHER PUBLICATIONS

International Search Report.

* cited by examiner

*Primary Examiner*—Leo Boudreau
*Assistant Examiner*—Kanji Patel
(74) *Attorney, Agent, or Firm*—Nixon Peabody LLP; Donald R. Studebaker

(57) ABSTRACT

Black inverted noises in a white background due to resolution correction are reduced by an image processing apparatus which carries out image modification processing to invert at least a portion of a binary converted signal obtained from binary conversion of an image signal. An image signal S1 is respectively input to resolution correction means 201 and 202 using different correction amounts. The signal is then input to selecting means 310 from the both resolution correction means. The signal output from the selecting means is input to binary conversion means 400 and a signal S2 output therefrom is input to image modification processing means 500. when image modification processing has been instructed, a control signal CNT1 is input to the selecting means 310 and the selecting means output a signal with weak resolution correction from the resolution correction means 202 using a small correction amount.

5 Claims, 18 Drawing Sheets

CONTROLLING CPU : CONFIRMS EXISTENCE OF INVERSION OR
INSIDE WHITENING PROCESSING SIGNAL
AND DECIDES NECESSITY OF MTF CORRECTION
BEFORE STENCIL MAKING OPERATION STARTS

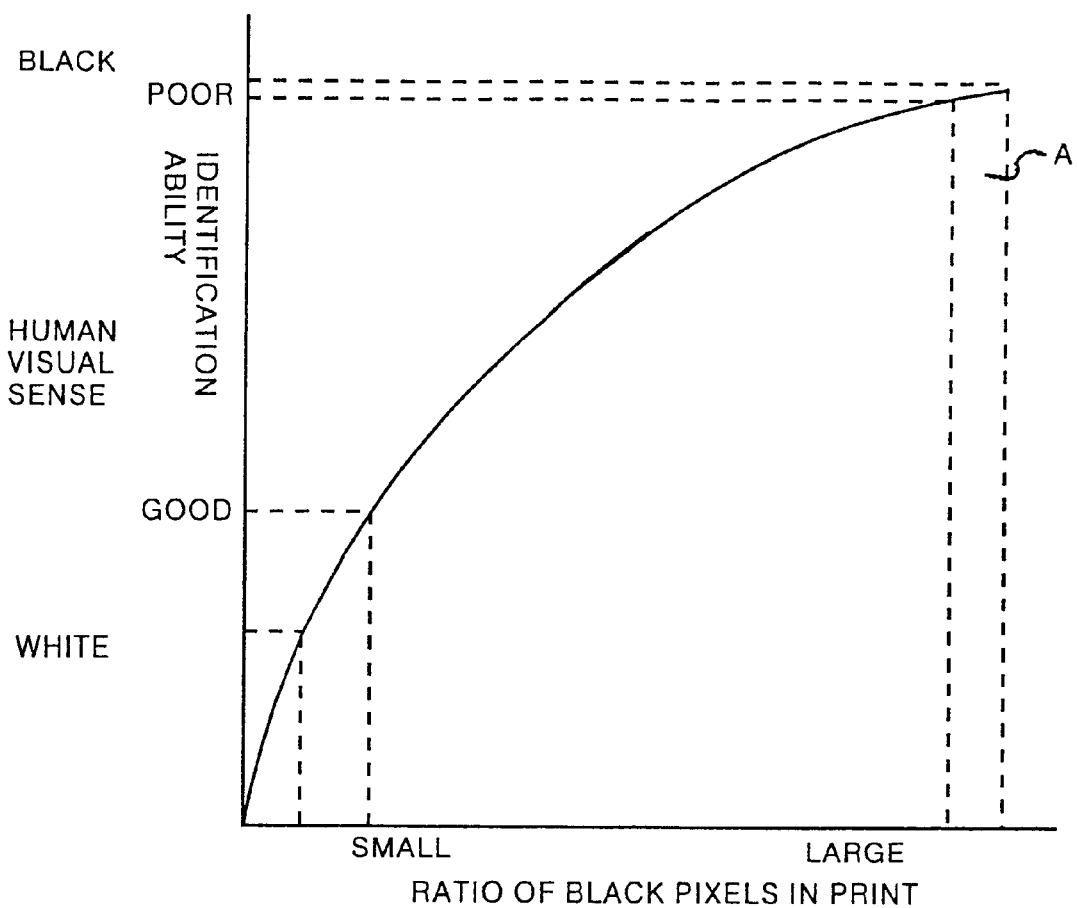

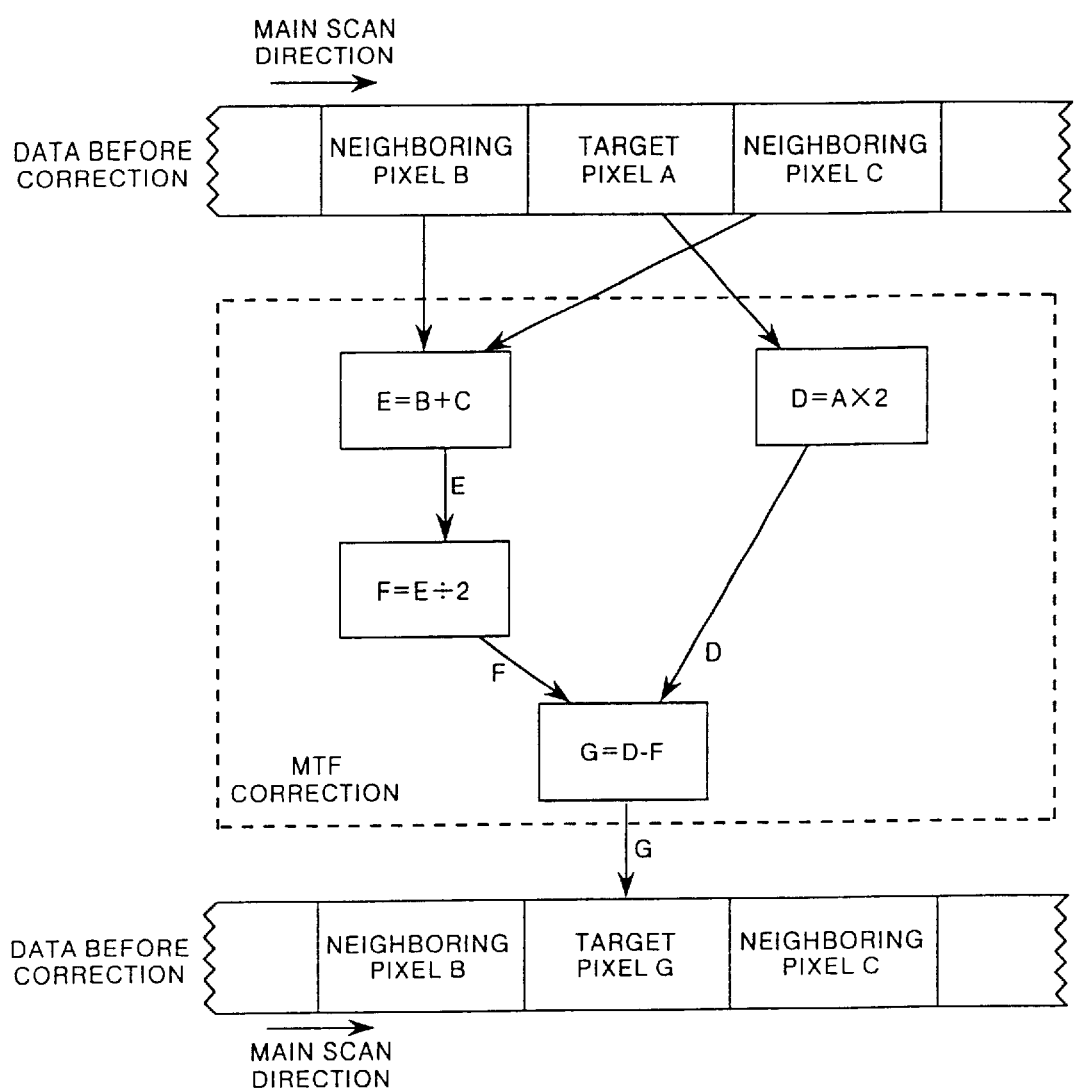

FIG.12

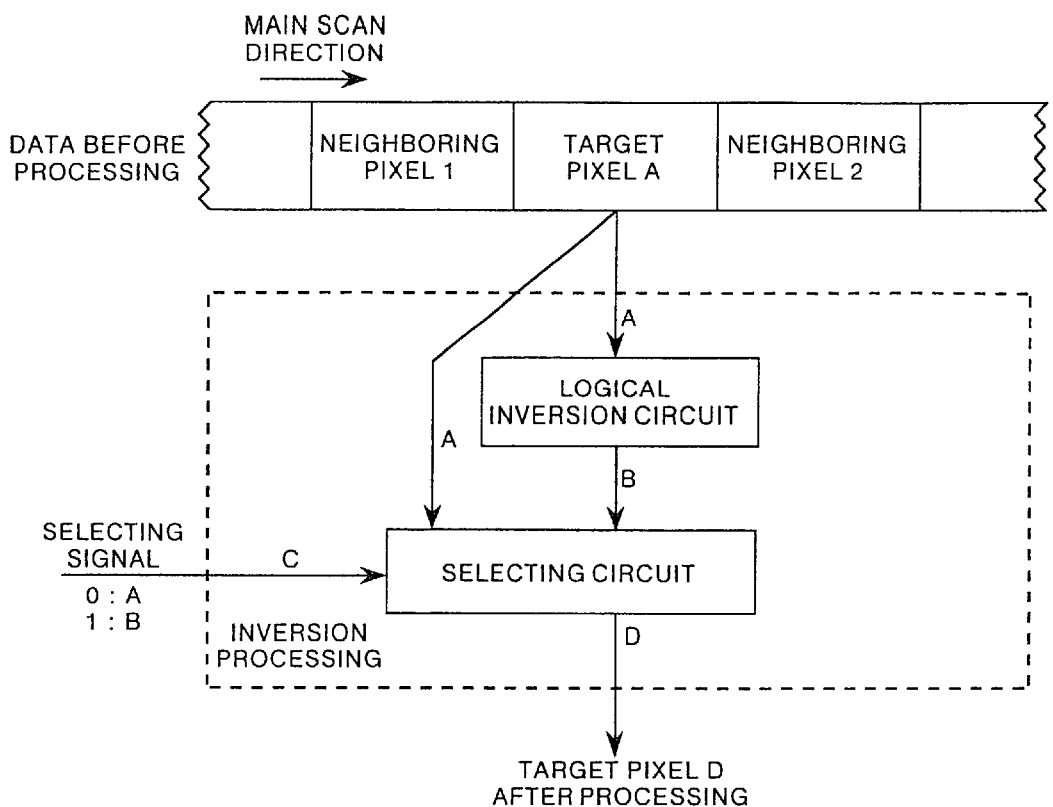

TARGET PIXEL D AFTER PROCESSING = $(A \cdot \overline{C}) + (\overline{A} \cdot C)$

+ : LOGICAL ADD, · : LOGICAL PRODUCT, ‾ : LOGICAL INVERSION (1) IF TARGET PIXEL A BEFORE PROCESSING IS WHITE (A=0) AND
SELECTING CIRCUIT SELECTS NON-INVERSION (C=0),
TARGET PIXEL D AFTER PROCESSING = $(0 \cdot \overline{0}) + (\overline{0} \cdot 0) = 0$ ; BECOMES WHITE PIXEL (2) IF TARGET PIXEL A BEFORE PROCESSING IS BLACK (A=1) AND
SELECTING CIRCUIT SELECTS NON-INVERSION (C=0),
TARGET PIXEL D AFTER PROCESSING = $(1 \cdot \overline{0}) + (\overline{1} \cdot 0) = 1$ ; BECOMES BLACK PIXEL (3) IF TARGET PIXEL A BEFORE PROCESSING IS WHITE (A=0) AND
SELECTING CIRCUIT SELECTS INVERSION (C=1),
TARGET PIXEL D AFTER PROCESSING = $(0 \cdot \overline{1}) + (\overline{0} \cdot 1) = 1$ ; BECOMES BLACK PIXEL (4) IF TARGET PIXEL A BEFORE PROCESSING IS BLACK (A=1) AND
SELECTING CIRCUIT SELECTS INVERSION (C=1),
TARGET PIXEL D AFTER PROCESSING = $(1 \cdot \overline{1}) + (\overline{1} \cdot 1) = 0$ ; BECOMES WHITE PIXEL

FIG.13A

DATA BEFORE MTF CORRECTION

|   | A | B | C | D | E | F | G | H | I | J | K | L | M |
|---|---|---|---|---|---|---|---|---|---|---|---|---|---|
| 1 | 60 | 60 | 50 | 60 | 50 | 60 | 80 | 80 | 80 | 80 | 80 | 80 | 80 |
| 2 | 60 | 60 | 50 | 60 | 50 | 60 | 80 | 80 | 80 | 80 | 80 | 80 | 80 |
| 3 | 60 | 60 | 50 | 60 | 50 | 60 | 80 | 80 | 80 | 80 | 60 | 80 | 80 |
| 4 | 60 | 60 | 50 | 60 | 50 | 60 | 80 | 80 | 80 | 80 | 80 | 80 | 80 |
| 5 | 60 | 60 | 50 | 60 | 50 | 60 | 80 | 80 | 80 | 80 | 80 | 80 | 80 |

MAIN SCAN DIRECTION →

VERTICAL SCAN DIRECTION ↓

NOISE

*THE LARGER THE VALUE IS, THE DARKER

FIG.13B

DATA AFTER MTF CORRECTION

|   | A | B | C | D | E | F | G | H | I | J | K | L | M |
|---|---|---|---|---|---|---|---|---|---|---|---|---|---|
| 1 | 60 | 65 | 40 | 70 | 40 | 55 | 90 | 80 | 80 | 80 | 80 | 80 | 80 |
| 2 | 60 | 65 | 40 | 70 | 40 | 55 | 90 | 80 | 80 | 80 | 80 | 80 | 80 |
| 3 | 60 | 65 | 40 | 70 | 40 | 55 | 90 | 80 | 80 | 90 | 40 | 90 | 80 |
| 4 | 60 | 65 | 40 | 70 | 40 | 55 | 90 | 80 | 80 | 80 | 80 | 80 | 80 |
| 5 | 60 | 65 | 40 | 70 | 40 | 55 | 90 | 80 | 80 | 80 | 80 | 80 | 80 |

MAIN SCAN DIRECTION →

VERTICAL SCAN DIRECTION ↓

LARGE NOISE

*THE LARGER THE VALUE IS, THE DARKER

THE CASE WHERE DATA AFTER MTF CORRECTION ARE BINARY CONVERTED TO WHITE IF THE VALUES ARE 50 OR SMALLER AND TO BLACK IF OTHERWISE.

THE CASE WHERE DATA AFTER MTF CORRECTION ARE BINARY CONVERTED (TO WHITE IF THE VALUES ARE 50 OR SMALLER) AND INVERTED.

THE CASE OF VISUAL EXPRESSION

BECOMES CONSPICUOUS AS BLACK DOT

TARGET PIXEL (K) AFTER PROCESSING

TARGET PIXEL (K) AFTER PROCESSING=$(A \cdot \overline{J}) + (A \cdot \overline{(B \cdot C \cdot D \cdot E)} \cdot J)$

· : LOGICAL PRODUCT, + : LOGICAL ADD, ⁻ : LOGICAL INVERSION

FIG.16A

EXAMPLE OF INSIDE WHITENING PROCESSING CALCULATION

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

VERTICAL SCAN DIRECTION ↓

MAIN SCAN DIRECTION →

B : BLACK, W : WHITE

FIG.16B

UPPER EDGE JUDGMENT, INSIDE WHITENING PROCESSING IS SELECTED AT TARGET PIXEL c3

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

$$K = (1 \cdot \overline{1}) + (1 \cdot \overline{(0 \cdot 1 \cdot 1 \cdot 1)} \cdot 1) = 1$$

FIG. 16C

LOWER EDGE JUDGMENT, INSIDE WHITENING
PROCESSING IS SELECTED AT TARGET PIXEL c6

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

$$K = (1 \cdot \overline{1}) + (1 \cdot \overline{(1 \cdot 0 \cdot 1 \cdot 1)} \cdot 1) = 1$$

FIG. 16D

LEFT EDGE JUDGMENT, INSIDE WHITENING
PROCESSING IS SELECTED AT TARGET PIXEL b5

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

$$K = (1 \cdot \overline{1}) + (1 \cdot \overline{(1 \cdot 1 \cdot 0 \cdot 1)} \cdot 1) = 1$$

FIG.16E

RIGHT EDGE JUDGMENT, INSIDE WHITENING
PROCESSING IS SELECTED AT TARGET PIXEL e5

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

$$K=(1 \cdot \overline{1})+(1 \cdot \overline{(1 \cdot 1 \cdot 1 \cdot 0)} \cdot 1)=1$$

FIG.16F

JUDGMENT OF INSIDE WHITENING PROCESSING TARGET, INSIDE
WHITENING PROCESSING IS SELECTED AT TARGET PIXEL d4

|   | a | b | c | d | e | f |
|---|---|---|---|---|---|---|
| 1 | W | W | W | W | W | W |
| 2 | W | W | W | W | W | W |
| 3 | W | B | B | B | B | W |
| 4 | W | B | B | B | B | W |
| 5 | W | B | B | B | B | W |
| 6 | W | B | B | B | B | W |
| 7 | W | W | W | W | W | W |
| 8 | W | W | W | W | W | W |

$$K=(1 \cdot \overline{1})+(1 \cdot \overline{(1 \cdot 1 \cdot 1 \cdot 1)} \cdot 1)=0$$

THE CASE WHERE DATA AFTER MTF CORRECTION ARE BINARY CONVERTED (TO WHITE IF THE VALUES ARE 50 OR SMALLER) AND INSIDE WHITENING PROCESSED.

MAIN SCAN DIRECTION    B : BLACK, W : WHITE    BLACK PIXELS REMAIN

THE CASE OF VISUAL EXPRESSION

THE CASE WHERE DATA WITHOUT MTF CORRECTION ARE BINARY CONVERTED TO WHITE IF THE VALUES ARE 50 OR SMALLER AND TO BLACK IF OTHERWISE.

THE CASE WHERE DATA WITHOUT MTF CORRECTION ARE BINARY CONVERTED (TO WHITE IF THE VALUES ARE 50 OR SMALLER) AND INVERTED.

THE CASE OF VISUAL EXPRESSION

FIG.19A

THE CASE WHERE DATA WITHOUT MTF CORRECTION ARE BINARY CONVERTED TO WHITE
IF THE VALUES ARE 50 OR SMALLER AND TO BLACK IF OTHERWISE (AS IN FIGURE 18(A)).

|   | A | B | C | D | E | F | G | H | I | J | K | L | M |
|---|---|---|---|---|---|---|---|---|---|---|---|---|---|
| 1 | B | B | W | B | W | B | B | B | B | B | B | B | B |
| 2 | B | B | W | B | W | B | B | B | B | B | B | B | B |
| 3 | B | B | W | B | W | B | B | B | B | B | B | B | B |
| 4 | B | B | W | B | W | B | B | B | B | B | B | B | B |
| 5 | B | B | W | B | W | B | B | B | B | B | B | B | B |

→ MAIN SCAN DIRECTION    B : BLACK, W : WHITE    BECOMES BLACK PIXEL    ↓ VERTICAL SCAN DIRECTION

FIG.19B

THE CASE WHERE DATA WITHOUT MTF CORRECTION ARE BINARY CONVERTED (TO
WHITE IF THE VALUES ARE 50 OR SMALLER) AND INSIDE WHITENING PROCESSED.

|   | A | B | C | D | E | F | G | H | I | J | K | L | M |
|---|---|---|---|---|---|---|---|---|---|---|---|---|---|
| 1 | B | B | W | B | W | B | B | B | B | B | B | B | B |
| 2 | B | B | W | B | W | B | W | W | W | W | W | W | B |
| 3 | B | B | W | B | W | B | W | W | W | W | W | W | B |
| 4 | B | B | W | B | W | B | W | W | W | W | W | W | B |
| 5 | B | B | W | B | W | B | B | B | B | B | B | B | B |

→ MAIN SCAN DIRECTION    B : BLACK, W : WHITE    ↓ VERTICAL SCAN DIRECTION

FIG.19C

THE CASE OF VISUAL EXPRESSION

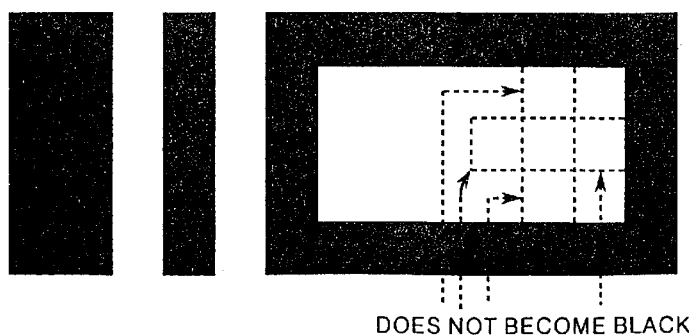

DOES NOT BECOME BLACK

IMAGE PROCESSING APPARATUS

This application is a Continuation of U.S. patent Ser. No. 09/106,766 filed Jun. 30, 1998.

BACKGROUND OF THE INVENTION

1. Field of the Invention

The present invention relates to an image processing apparatus, and more specifically, to a measure to cope with noises generated by an image processing apparatus which carries out image modification processing to invert at least a portion of a binary signal obtained through binary conversion of an image signal on which resolution correction for improving spatial resolution has been carried out.

2. Description of the Related Art

An image inputting apparatus has been known which obtains an image signal carrying image information of an original by scanning the original with an image sensor or the like and converting the original image into an electric signal (for example, a scanner, or a stencil making apparatus). To improve optical resolution, it is general for such an image inputting apparatus to carry out resolution correction for improving the spatial resolution of an image (for example, MTF correction) on an image signal having been obtained.

After an image signal have been binary converted, if the image wherein white pixels are scarcely seen in a black pixel dominant area (a black pixel area) is printed by a printer for example, the white pixels in the black pixel area are not so conspicuous. However, when such an image is printed by a printer after inversion processing or inside whitening processing has been carried out thereon, black pixels which have been inverted from scarce white pixels in a white pixel dominant area (a white pixel area) which has been inverted from the black pixel area become conspicuous. This visual phenomenon has been known.

FIG. 10 is a diagram showing this visual phenomenon and shows a relation between the human visual sense and a ratio of black pixels within an area printed by a printer. In the area where black pixels are dominant (a portion to the right in the figure), the ability to identify a predetermined number of white pixels (A) therein is low and the white pixels are not conspicuous. In the area (a portion to the left of FIG. 10) where black pixels are scarce, that is, the area wherein white pixels are dominant, the ability to identify the same number of black pixels (B) therein is high and the black pixels are very conspicuous.

Especially in stencil making printing for example, the finish itself of printing tends to extend areas of black pixels due to an effect so-called smear of ink. Therefore, black pixels in a white pixel dominant area become much more conspicuous.

When MTF correction is carried out on an image signal, the above phenomenon becomes more conspicuous. This is because that a white noise signal mixed with an image signal output from an image sensor or the like and having the density of black becomes too enhanced by binary conversion to be at the level of white after MTF correction has been carried out on the image. Therefore, in some cases, after binary conversion has been carried out on a signal having been MTF corrected and a predetermined area has been specified by a digitizer or the like, if signal inverting processing (hereinafter called image modification processing), for example inversion processing and inside whitening processing on the signal in the predetermined area or hatching processing on the area whose inside has been whitened, is carried out on at least a portion of the signal having been binary converted, a portion of the image in the predetermined area which should be inverted from black to white is not inverted and remains black. As a result, black noises in white background become conspicuous.

Hereinafter, the reason why this phenomenon becomes conspicuous after binary conversion has been carried out on a signal having been MTF corrected. MTF correction will first be explained briefly. FIG. 11 shows a general MTF correction method. In this MTF correction, the value of a target pixel A to be processed is doubled (D=A×2). A value E which is a sum of the values B and C of pixels neighboring with A in the horizontal (main scanning) direction (E=B+C) is divided by 2 to make F (F=E÷2), and F is subtracted from D to make G (G=D−F). In this manner, when the value A of the target pixel is different from the values of neighboring pixels B and C, the value A is changed to a larger one if A is larger than those, and to a smaller one if otherwise. Therefore, by sequentially applying this MTF correction along the main scanning direction, optical resolution along the main scanning direction can be improved maintaining the average (the average density) of the values in the image signal. It is needless to say that vertical optical resolution can be improved as well by applying this correction to pixels neighboring with the target pixel in vertical direction.

The phenomenon in which black pixels due to a noise signal are created by inversion processing on a signal having been MTF corrected will be explained next. FIG. 12 shows an example of inversion processing. The basis of the inversion processing is to carry out logical inversion on a target pixel A before processing. In the block diagram and logic expression in FIG. 12, a circuit for selecting whether to carry out inversion processing is further added to the above basis.

By carrying out this inversion processing, processing shown at the bottom of FIG. 12 corresponding to a selecting signal C from the selecting circuit is carried out on the target pixel A before inversion. In the case of non-inversion (the selecting signal C is 0), a target pixel D after the processing has the same logic as the target pixel A before the processing, while in the case of inversion (the selecting signal C is 1), the target pixel D after the processing has the logic inverted from that of the target pixel A before the processing. The case where this inversion processing is actually applied to an image signal will be explained next.

An image signal carrying image information of an original is obtained by scanning the original by using an image sensor and converting the original image into an electric signal, and the image signal is converted from analogue to digital by using an A/D converter. An example of the values of the digital signal is shown as a table in FIG. 13 (A). In FIG. 13 (A), the value 60 of a pixel K3 is a little smaller than the value 80 of the surrounding pixels, and shows a small noise component. However, when binary conversion is carried out on these pixels wherein the values 50 or smaller are converted to white pixels, both the pixel K3 and the surrounding pixels are binary converted to black pixels. Therefore, the pixel K3 does not turn out to be a noise which can be recognized as a white pixel in a black pixel area. Consequently, when the inversion processing is carried out thereon, the pixel K3 becomes a white pixel and it does not turn out to be a noise recognized as a black pixel. However, when the inversion processing is carried out after the MTF correction on the pixels, the pixel K3 becomes a black noise pixel.

The values after MTF correction carried out on the signal shown in FIG. 13 (A) are shown as a table in FIG. 13 (B).

As shown in FIG. 13 (B), the value of the pixel K3 has changed from 60 to 40 after the MTF correction, and the effect as a noise is greater than before the correction.

FIG. 14 (A) is a table showing data after binary conversion on the signal in FIG. 13 (B) wherein the pixels having the values 50 or smaller have been converted into white pixels and the pixels having the values larger than 50 have been converted into black pixels. The noise component in the pixel K3 is recognized as a white pixel in an area of black pixels.

FIG. 14 (B) shows a table after inversion processing on the pixels in FIG. 14 (A), and FIG. 14 (C) shows a visual expression of the pixels in FIG. 14 (B). As shown in FIGS. 14 (B) and 14 (C), the pixel K3 becomes a white pixel if no MTF correction has been carried out thereon, while it becomes a black pixel after the MTF correction. As a result, this black pixel becomes conspicuous.

The process through which a black pixel due to a noise signal is created by carrying out inside whitening processing on a signal after MTF correction is explained next. The process through which data after MTF correction are created is the same as in the explanation of the inversion processing in FIG. 12. FIG. 15 shows an algorithm of the inside whitening processing.

In the inside whitening processing, a cross-shape filter (+) composed of pixels B and C in vertical direction, pixels D and E in horizontal direction, and a target pixel A before processing at the center of these 4 pixels is applied sequentially to image data. When the pixels D and E neighboring with the target pixel A in the horizontal direction and the pixels B and C neighboring with the target pixel A in the vertical direction are all black pixels (the pixel arrangement in this state is called inside whitening processing target), a target pixel K after the processing is forced to be white regardless of the logic (whether the target pixel is a white pixel or a black pixel) of the target pixel A before the processing. This is the basic processing of the inside whitening processing. A circuit for selecting the inside whitening processing is added to the inside whitening processing shown as a block diagram and a logic expression in FIG. 15.

Through this inside whitening processing, the processing shown in FIG. 16 is carried out on the target pixel A before the processing in response to the neighboring pixels B through E and a selecting signal J from the selecting circuit. For a pixel pattern shown in FIG. 16 (A), in the cases of upper edge judgment (a pixel c2 above a target pixel c3 is white; B=0), lower edge judgment (a pixel c7 below a target pixel c6 is white; C=0), left edge judgment (a pixel a5 to the left of a target pixel b5 is white; D=0), and right edge judgment (a pixel f5 to the right of a target pixel e5 is white; E=0), the target pixels c3, c6, b5 and e5 after the processing are not white. However, if they are in the state of the inside whitening processing target (see FIG. 16 (F)), a target pixel d4 after the processing is forced to be white since neighboring pixels c4 and e4 in the horizontal direction and d3 and d5 in the vertical direction are all black. In the logic expressions in FIGS. 16 (B)–(F), black pixels are expressed as 1 and white pixels are 0.

The cross-shape filter in the above explanation having reference pixels and the target pixel in its center has only one pixel in each direction (upper, lower, left, and right) and the border after the inside whitening processing has the thickness of one pixel. However, by extending the range of the reference pixels in each direction (to make the cross-shape enlarged in each direction), the border after the inside whitening processing can be thickened.

FIG. 17 (A) is a table showing data wherein the data after the MTF correction shown in FIG. 14 (A) have been binary converted to white if the values are 50 or smaller and to black if otherwise and inside whitened thereafter. FIG. 17 (B) shows a visual expression of the data. As shown in FIGS. 17 (A) and 17 (B), the target pixel K3 before the inside whitening processing appears to be a mere white pixel, while it becomes very conspicuous after the inside whitening processing, because pixels surrounding K3 generate more black pixels than in the above inversion processing, due to the inside whitening processing algorithm.

SUMMARY OF THE INVENTION

The present invention has been created based on consideration of the above problems. Its object is to provide an image processing apparatus which does not generate black pixels (black noises) having been described above, even in the case where resolution correction for improving spatial resolution of an image has been carried out on the image and binary conversion and subsequent image modification processing such as inversion processing or inside whitening processing are carried out on the image signal.

An image processing apparatus related to the present invention has resolution correction means which carries out resolution correction on an image signal to improve spatial resolution of an image, binary conversion means which carries out binary conversion on the image signal whose resolution has been corrected by the resolution correction means, and image modification processing means which carries out image modification processing to invert at least a portion of the image signal having been binary converted by the binary conversion means based on a predetermined instruction, and is characterized by that the image processing apparatus comprises correction amount changing means which makes a correction amount of the resolution correction by the resolution correction means small based on the predetermined instruction.

The "image modification processing wherein at least a portion . . . is inverted" means processing which can generate an inversion noise by carrying out processing such as inversion, inside whitening, and hatching of the area whose inside has been whitened by the inside whitening processing on a signal obtained by binary conversion of the image signal after the resolution processing thereon. The image modification processing includes not only the processing on an image signal for the entire area but also the processing on an image signal in a desired area having been set. Hereinafter, the "inversion noise" means the noise appearing as black dots on a white background caused by the image modification processing.

The "predetermined instruction" means an instruction to order carrying out image modification processing, and the instruction may include area specification.

To "make the correction amount . . . small" means to make the degree of the resolution correction (the correction amount) small, and includes the case of no correction (i.e., the correction amount is 0).

The correction amount changing means in the above image processing apparatus is meant to comprise two resolution correction means which have different correction amounts for the resolution correction, and selecting means which selects one of image signals whose resolution has been corrected by the two resolution correction means. The selecting means can select the image signal with a smaller correction amount between the image signals whose resolution has been corrected by the two resolution correction means, based on the predetermined instruction.

The correction amount changing means comprises the two resolution correction means which use different correction amounts for the resolution correction, two binary conversion means which carry out binary conversion on each of the image signals whose resolution has been corrected by the resolution correction means, and selecting means which selects one of the image signals having been binary converted by the binary conversion means. Between the image signals whose resolution has been corrected by the two resolution correction means, the selecting means selects the binary converted signal with a smaller amount of correction based on the predetermined instruction.

The correction amount changing means may comprise resolution correction means whose correction amount can vary.

Furthermore, the correction amount changing means may change the correction amount small for the image signal composing an entire image, based on the predetermined instruction. Alternatively, the correction amount changing means may change the correction amount small only for a portion of the image signal in an area instructed by the predetermined instruction. The "image signal composing an entire image" means an image signal which this image processing apparatus can handle at one time, such as an image signal corresponding to a page which can be specified by a digitizer at once.

Furthermore, an image processing apparatus related to the present invention has resolution correction means which carries out resolution correction on an image signal for improving spatial resolution of an image, binary conversion means which carries out binary conversion on the image signal whose resolution has been corrected by the resolution correction means, and image modification processing means which carries out image modification processing to invert at least a portion of the image signal which has been binary converted by the binary conversion means based on a predetermined instruction, and is characterized by that the image processing apparatus comprises:

two resolution correction means using different correction amounts for the resolution correction;

two binary conversion means which carry out binary conversion on each of the image signals whose resolution has been corrected by the two resolution correction means;

image modification processing means which carries out image modification processing only on a binary converted signal with a smaller amount of resolution correction between the image signals whose resolution has been corrected by the two resolution correction means, and selecting means which selects either the image signal on which image modification processing has been carried out by the image modification processing means or the binary converted signal with a larger amount of correction between the image signals whose resolution has been corrected by the two resolution correction means, and also characterized by that the selecting means selects the image signal on which the image modification processing has been carried out by the image modification processing means based on the predetermined instruction.

In this image processing apparatus, based on the predetermined instruction, the selecting means may select the image signal composing an entire image or a portion of the image signal for an area instructed by the predetermined instruction, on which the image modification processing has been carried out by the image modification processing means.

In any of the above image processing apparatus comprising the "two resolution correction means", in the case of "without correction", the correction amount for one of the resolution correction means may be 0, or one of the resolution correction means for "without correction" does not exist and the signal may pass the portion equivalent to the resolution correction means for without correction.

When the image processing apparatus of the present invention receives an instruction to carry out image modification processing such as inversion processing or inside whitening processing, the image modification processing is assuredly carried out on either the image signal on which resolution correction using a small correction value has been carried out or the image signal without resolution correction. Therefore, the problem of an inversion noise caused by image modification processing carried out on an image signal having been through resolution correction will be solved.

If the image modification processing is carried out on either an image signal with small amount of resolution correction or on an image signal without resolution correction in an area whose modification processing has been instructed, a portion within the area, which should be inverted from black to white, can be processed without generating a black noise and the resolution of the area outside the instructed one is corrected. Therefore, smear or degradation of optical resolution of letters in a high frequency portion outside the instructed area will not occur.

The configuration therefor is comparatively easy, which makes the industrial value thereof high.

The reason why so-called black noises are reduced or not generated after image modification processing such as inversion processing or inside whitening processing has been carried out on a binary converted image signal with weak MTF correction or no MTF correction thereon will be explained briefly.

FIG. 18 (A) shows a table wherein data before MTF correction shown in FIG. 13 (A) have been binary converted to white if the values are 50 or smaller and to black if otherwise. As shown in FIG. 18 (A), if no MTF correction has been carried out, the noise at the pixel K3 in FIG. 13 (A) (having a value 60 while other pixels have 80) is not amplified and the pixel K3 is normally binary converted to a black pixel.

FIG. 18 (B) shows a table of data which have been inverted from the data shown in FIG. 18 (A), and FIG. 18 (C) shows the data visually. Different from FIGS. 14 (B) and 14 (C) which show the case where data after MTF correction are binary converted to white pixels if the values are 50 or smaller and inverted thereafter, no black noise appears and the inversion processing has been carried out successfully.

On the other hand, FIG. 19 (B) shows a table of data wherein the data in FIG. 18 (A) have inside whitening processed, and FIG. 19 (C) shows the data visually. As a reference, FIG. 19 (A) shows the same table as in FIG. 18 (A). As in the case of the inversion processing above, no black noise appears and the inside whitening processing has been carried out successfully, different from the case shown in FIG. 17 wherein binary conversion to white if the values are 50 or smaller and inversion processing thereafter are carried out on the data after MTF correction.

In the above explanation, the case of binary conversion on an image signal without MTF correction has been described. In the case where the correction amount of MTF is reduced than in normal cases, the effect almost the same is observed. This is because that the weaker the MTF correction is, the less an effect of noise signal amplification is. Therefore, conversion to black pixels is carried out normally.

BRIEF DESCRIPTION OF THE DRAWINGS

FIG. 10 is a diagram showing a relation between the human visual sense and a ratio of black pixels in an area printed by a printer;

FIG. 11 is a diagram showing a general MTF correction method;

FIG. 12 is a diagram showing an example of inversion processing;

FIGS. 13 (A) and (B) are diagrams showing MTF correction carried out on a predetermined image;

FIGS. 16 (A) through (F) are diagrams explaining the inside whitening processing with reference to pixel patterns;

FIGS. 19 (A) to (C) are diagrams showing an example wherein data without MTF correction are binary converted and inside whitened thereafter.

DESCRIPTION OF THE PREFERRED EMBODIMENTS

Hereinafter, specific embodiments of image processing apparatuses related to the present invention will be explained with reference to the accompanying drawings.

Figure 1:
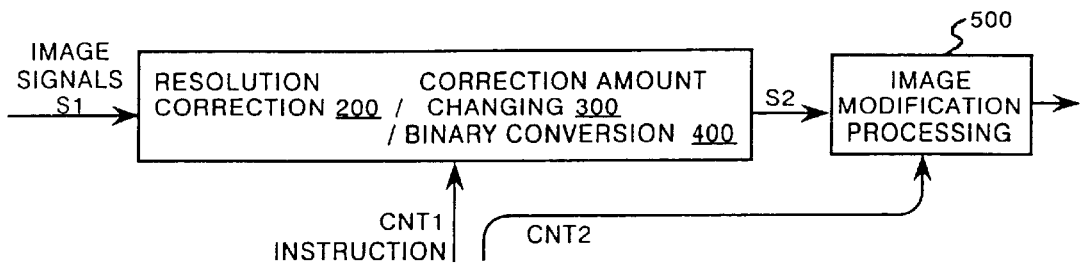
FIG. 1 is a block diagram showing a basic configuration of a first image processing apparatus related to the present invention.

FIG. 1 is a block diagram showing a basic configuration of a first image processing apparatus related to the present invention. In this configuration, when no image modification processing is carried out, an image signal with resolution correction at a normal level (for example, MTF correction) is binary converted and output. When the image modification processing is instructed, either an image signal on which weak resolution correction has been carried out or an image signal on which no resolution correction has been carried out is binary converted and modification processing is then carried out thereon.

Various kinds of signal processing is carried out on an image signal S1 by resolution correction means 200, correction amount changing means 300 which changes the amount of resolution correction, and binary conversion means 400. Image modification processing such as inversion processing or inside whitening processing is then carried out on the signal by image modification processing means 500. The resolution correction means 200, the correction amount changing means 300, and the binary conversion means 400 may be connected in any manner as long as a signal input to the image modification processing means 500 is the image signal having been processed through weak resolution correction and binary conversion when the image modification processing is instructed. By the instruction to order image modification processing, a control signal CNT2 including information showing an area to be processed by the image modification is input to the image modification processing means 500. The image modification processing means 500 then carries out inversion processing or inside whitening processing on a binary signal S2 corresponding to the area having been instructed. When no image modification is carried out, the control signal CNT2 is not input to the image modification processing means 500, and a signal without image modification processing is output from the image modification processing means 500.

The change of resolution correction amount by the resolution correction means 300 may be carried out on an image signal corresponding to a specified area by making a control signal CNT1 input to the correction amount changing means 300 almost equal to the control signal CNT2. Alternatively, the correction amount may be changed for an image signal corresponding to an entire image when the image modification processing is instructed.

By the configuration in the above, when no image modification processing is carried out, a signal which has been binary converted from the image signal with resolution correction at a normal level is output as it is, and when the image modification has been ordered, the processing is carried out on a binary converted signal with weak resolution correction or without resolution correction. Therefore, the problem of black noises caused by image modification processing on an image signal whose resolution has been corrected is solved.

Figure 2:
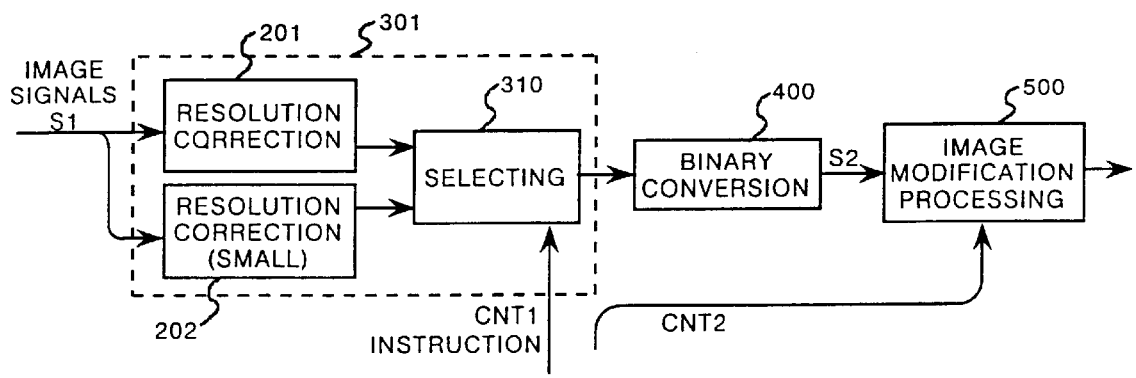
FIG. 2 is a block diagram (part 1) showing how correction amount changing means in the first image processing apparatus is specifically connected.
Figure 3:
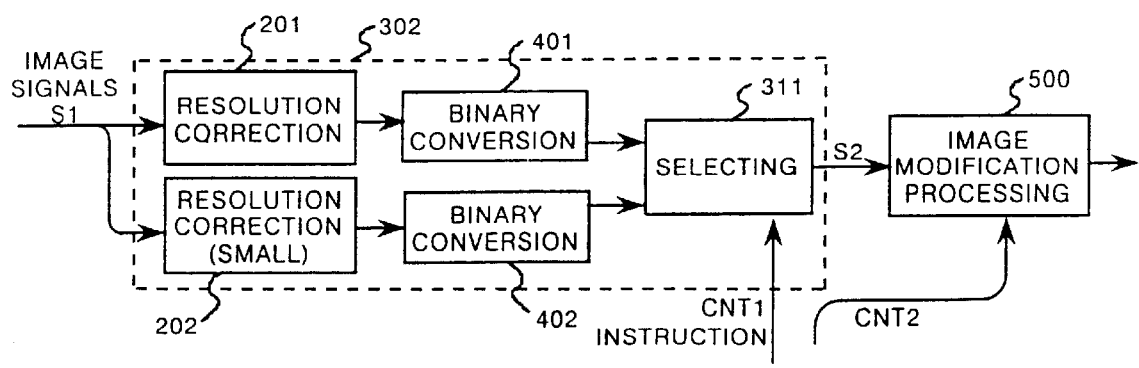
FIG. 3 is a block diagram (part 2) showing how the correction amount changing means in the first image processing apparatus is specifically connected.
Figure 4:
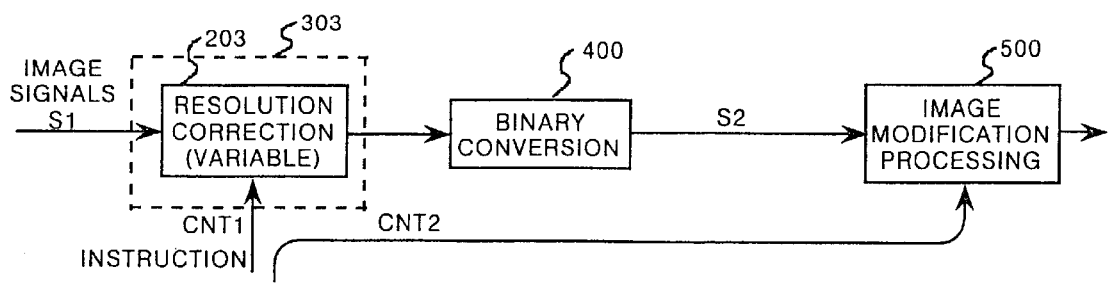
FIG. 4 is a block diagram (part 3) showing how the correction amount changing means in the first image processing apparatus is specifically connected.

FIGS. 2 to 4 are block diagrams showing specific connections between the correction amount changing means 300 and the binary conversion means 400.

In an image processing apparatus shown in FIG. 2, correction amount changing means 301 is configured so that it comprises resolution correction means 201 and 202 using different resolution correction amounts and selecting means 310 which selects a signal output from either the resolution correction means 201 or 202. Binary conversion is carried out after the correction amount is changed by the correction amount changing means 301. The selecting means 310 selects an image signal on which resolution correction has been carried out by the resolution correction means 201 (using a normal correction amount) when no image modification processing is to be carried out. When image modification processing has been instructed, the selecting means selects an image signal on which resolution correction has been carried out by the resolution correction means 202 (using a small correction amount). The image signal having been selected by the selecting means 310 is binary converted by binary conversion means 400 to produce a signal S2 and image modification processing means 500 carries out image modification processing on S2. The resolution correction means 202 may use 0 as the correction amount, that is, it may not carry out resolution correction. Alternatively, the image processing apparatus may not comprise the resolution correction means 202 and the image signal S1 may be input directly to the selecting means 310.

In the above configuration, one resolution correction means exists as the resolution correction means 202. However, the number of the resolution correction means 202 may not be limited to 1, and a plurality of resolution correction means using small correction values may be used. In this manner, the degree of resolution correction can be changed in smaller steps for processing such as inversion processing or inside whitening processing which produces visual noises in various manner. This idea is the same for the configurations shown in FIGS. 3 to 5 which will be explained below.

In an image processing apparatus shown in FIG. 3, correction amount changing means 302 comprises resolution correction means 201 and 202 using different correction amounts, binary conversion means 401 and 402 which respectively carry out binary conversion on signals output from the resolution correction means 201 and 202, and selecting means 311 which selects a binary converted signal from either the binary conversion means 401 or the binary conversion means 402. When no image modification is carried out, the selecting means 311 selects a signal having been binary converted by the binary conversion means 401 whose resolution has been corrected by the resolution correction means 201 (using a normal correction amount). When image modification processing has been instructed, the selecting means 311 selects a signal having been binary converted by the binary conversion means 402 whose resolution has been corrected by the resolution correction means 202 (using a small correction amount). The image modification processing is carried out by image modification processing means 500 on the signal having been selected by the selecting means 311. In this configuration, the resolution correction means 202 may use 0 as the correction amount, that is, the resolution correction means 202 may not carry out any resolution correction. Alternatively, the correction amount changing means 302 may not comprise the resolution correction means 202 and directly input an image signal S1 to the binary conversion means 402.

In an image processing apparatus shown in FIG. 4, correction amount changing means 303 comprises resolution If correction means 203 using a variable correction amount, and binary conversion is carried out after the correction amount has been changed by the correction amount changing means 303. The correction amount changing means 303 carries out resolution correction using a normal correction amount if no image modification processing is to be carried out, and carries out resolution correction using a small correction amount when image modification processing has been instructed. An image signal whose resolution has been corrected by the resolution correction means 203 is binary converted by binary conversion means 400, and image modification processing means 500 carries out the image modification processing on the binary converted signal. The small correction amount used in the resolution correction may take 0.

In any one of the above image processing apparatuses, when image modification processing has been instructed, if the correction amount changing means 300 to 303 inputs to the image modification processing means 500 the image signal S1 for an entire image on which weak resolution correction has been carried out, or if the resolution correction is carried out using a small correction amount on an image signal in an area specified by the instruction, image signals wherein resolution correction using the small correction amount has been carried out on the image signal only in the area specified by the instruction can be input to the image modification processing means 500.

Figure 5:
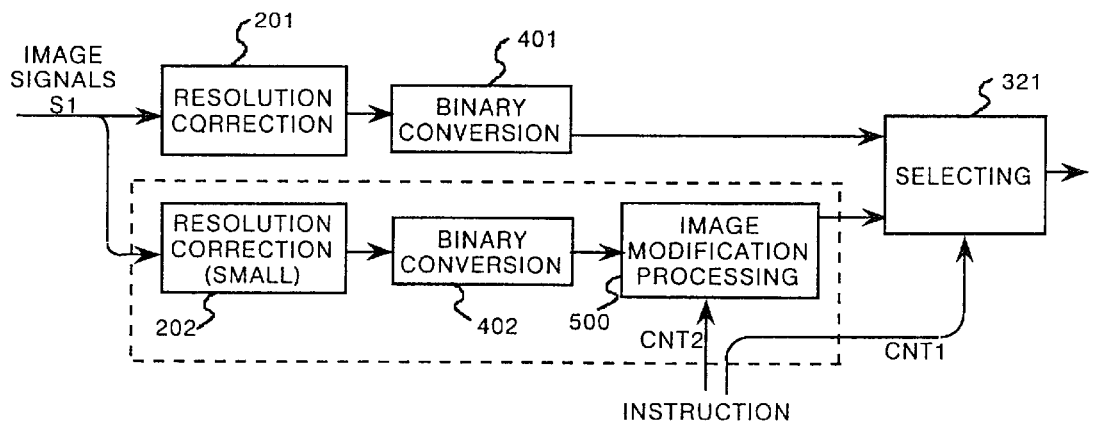
FIG. 5 is a block diagram showing a basic configuration of a second image processing apparatus related to the present invention.

FIG. 5 is a block diagram showing a basic configuration of a second image processing apparatus related to the present invention. Image modification processing is always carried out on an image signal with weak resolution correction. If no image modification processing has been instructed, a binary converted signal on which resolution correction using a normal correction amount has been carried out is selected, and an image signal on which image modification processing has been carried out is selected if otherwise.

This image processing apparatus comprises resolution correction means 201 and 202 using different correction amounts, binary conversion means 401 and 402 which respectively carry out binary conversion on each of the signals output from the resolution correction means 201 and 202, image modification processing means 500 which carries out image modification processing on the binary converted signal from the binary conversion means 402, and selecting means 321 which selects an image signal from either the binary conversion means 401 or image modification processing means 500. The selecting means 321 selects a binary converted image signal on which resolution correction using a normal correction amount has been carried out by the resolution correction means 201, when image modification processing is not to be carried out. When the image modification processing has been instructed, the selecting means 321 selects an image signal which has been through weak resolution correction by the resolution correction means 202, binary conversion, and image modification processing. In this configuration, the resolution correction means 202 may use 0 as the correction amount, that is, the resolution correction may not necessarily be carried out. Alternatively, the image processing apparatus may lack the resolution correction means 202, and the image signal S1 may be input directly to the binary conversion means 402. In this manner, when no image modification processing is carried out, a binary converted signal on which normal resolution correction has been carried out is selected, and when the image modification processing has been instructed, a binary converted and then image modified signal with weak or no resolution correction is selected. Therefore, by the image processing apparatuses shown in FIGS. 1 to 4, the black noise problem due to modification processing on an image signal whose resolution has been corrected will be solved.

In the second image processing apparatus, as in the first one, a selecting signal from the selecting means 321 may select a signal on which image modification processing has been carried out corresponding to a specified area, by making a control signal CNT1 input to the selecting means 321 almost the same as the control signal CNT2. Alternatively, the selecting means 321 may select a signal on which image modification processing has been carried out for the entire image when image modification processing has been instructed.

Figure 6:
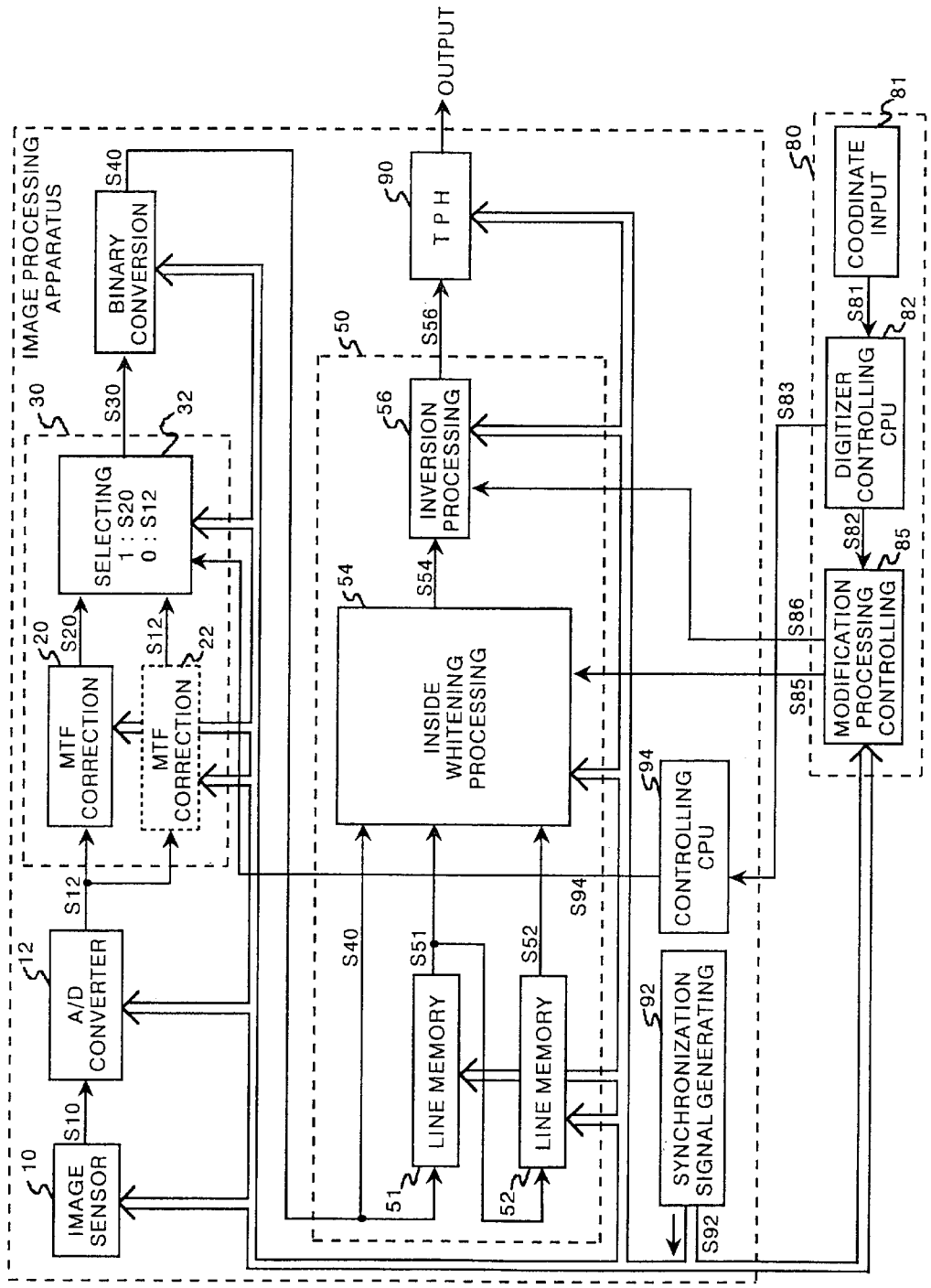
FIG. 6 is a block diagram showing a configuration of a first embodiment of an image processing apparatus related to the present invention.

A more specific embodiment of the image processing apparatus related to the present invention will be explained next. FIG. 6 is a block diagram showing a portion composing the first embodiment of the image processing apparatus related to the present invention used in a stencil printer wherein a stencil making apparatus and a printer are unified. It is needless to say that only the stencil making apparatus may be used, and the block diagram in FIG. 6 can be used in the same manner in that case.

The image processing apparatus related to the first embodiment comprises transfer means (in this case, a digitizer controlling CPU 82) which transfers a control signal 83 expressing whether or not an area to be modified by inversion processing or inside whitening processing has been specified from image modification processing controlling means such as a digitizer (hereinafter called a digitizer unit 80) to this image processing apparatus or to its controlling CPU 94. When the transfer means show the image modification area specification of the inversion processing or the inside whitening processing, MTF correction is weakened or canceled before stencil making (before image modification processing starts).

The image processing apparatus in the first embodiment adopts the configuration shown in FIG. 2. When stencil making including the inversion processing or the inside whitening processing is carried out, the MTF correction for the entire image is weakened or canceled. Therefore, a black noise can be prevented from being generated, and the size of image processing apparatus is not large. When no inversion processing or inside whitening processing is carried out in the stencil making, high resolution image processing with MTF correction and processing by the digitizer except for the inversion processing or the inside whitening processing can be carried out in parallel. Hereinafter, the configuration and operation of the image processing apparatus related to the first embodiment will be explained in detail.

The image processing apparatus comprises an image sensor 10, such as a line image sensor, which obtains an analogue image signal S10 by scanning an original image (optical information) which is not shown, an A/D converter 12 which converts the analogue signal S10 to a digital image signal S12, correction amount changing means 30 which outputs a corrected signal S30 after carrying out MTF correction using different correction amounts on the digital image signal S12 based on a selecting signal S94, binary conversion means 40 which outputs a signal (binary converted signal) S40 after carrying out binary conversion on the corrected signal S30 from the correction means 30 which is a multi-value signal, image modification processing means 50 which carries out image modification processing such as inversion processing or inside whitening processing on the signal S40 output from the binary conversion means 40, a line thermal print head TPH90 which records image information on a stencil master by using a heating element based on an output signal S56 on which image modification processing has been carried out by the image modification processing means 50, a synchronization signal generating circuit 92 which generates synchronization signals S92 for synchronizing the processing such as vertical scan synchronization signal, line (main scan) synchronization signal, image synchronization signal, and image validity signal, and a controlling CPU which controls the image processing apparatus, and a printer and a stencil making unit which are not shown in FIG. 6.

The correction amount changing means 30 comprises MTF correction means 20 which carries out MTF correction on the digital image signal S12 and outputs the corrected signal S20, and selecting means 32 which selects either the corrected signal S20 from the MTF correction means 20 or the digital image signal S12. The selecting means 32 selects either the MTF corrected signal S20 or the digital image signal S12 based on a selecting signal S94. In the case without MTF correction (the selecting signal S94 is OFF: 0), the digital image signal S12 is selected, while in the case with MTF correction (the selecting signal S94 is ON: 1), the MTF corrected signal S20 is selected. The selected signal is output as the output signal S30.

The selecting signal S94 is set by the controlling CPU94 which controls the image processing apparatus, and the printer and the stencil making unit (not shown). A coordinate input circuit 81 in the digitizer unit 80 transfers the coordinates of an area and image modification processing such as the inside whitening processing or the inversion processing specified by a user of the image processing apparatus as a control signal S81 to the digitizer controlling CPU 82. Based on the control signal S81, the digitizer controlling CPU 82 determines the content of the image modification processing and the area to be processed. If the inside whitening processing and/or the inversion processing has been instructed, the digitizer controlling CPU 82 outputs a control signal S83 expressing the necessity of inversion or inside whitening processing to the controlling CPU 94. After receiving the control signal S83, the controlling CPU 94 sets the selecting signal S94 OFF before image modification processing is carried out on the binary converted signal S40. In this manner, when either the inversion processing or the inside whitening processing is instructed, the digital image signal S12 without MTF correction thereon is selected as the output signal S30 from the correction amount changing means 30.

The digitizer controlling CPU 82 outputs the control signal S82 to a modification processing controlling circuit 85. Based on the content of the control signal S82, the modification processing controlling circuit correct 85 outputs a control signal S85 which controls an inside whitening processing circuit in synchronization with the synchronization signal S92 and a control signal S86 which controls an inversion processing circuit. The control signals S85 and S86 include information of a target area of the specified processing.

In this example, the digital image signal S12 without any correction can be selected. However, MTF correction means 22 shown by a dotted line in FIG. 6 may be installed so that correction weaker than that of the MTF correction means 20 can be carried out thereby. In this manner, in the case of no MTF correction (the selecting signal S94 is OFF: 0), the correction amount changing means 30 may select and output the signal from the MTF correction means 22.

Furthermore, either the digital image signal S12 or the corrected signal S20 may be selected based on the control signals S85 and S86 which will be described later, instead of the selecting signal S94.

By selecting a signal based on the control signals S85 and S86, and by carrying out binary conversion on image signals with strong and weak MTF correction, the binary converted signal with weak MTF correction is selected corresponding to the area on which the image modification processing such as inversion processing or inside whitening processing is carried out, and the binary converted signal with strong MTF correction is selected in the case where no image processing is carried out. In this configuration, even in the same stencil, a high resolution image with MTF correction can be used for the area except for the inversion processing area or the inside whitening processing area.

The image modification processing means 50 comprises line memories 51 and 52 in the FIFO structure, an inside whitening processing circuit 54, and an inversion processing circuit 56.

The line memory 51 holds the binary converted signal S40 corresponding to 1 line (a main scan line). In synchronization with the synchronization signal S92 from the synchronization signal generating circuit 92, the line memory 51 outputs a preceding line signal S51 and inputs the current line signal S40. The preceding line signal S51 output from the line memory 51 is a line signal including a target pixel. The line memory 52 holds the preceding line signal S51 corresponding to 1 line (a main scan line). In synchronization with the synchronization signal S92 from the synchronization signal generating circuit 92, the line memory 52 outputs a signal S52 in the line before the preceding line and inputs the preceding line signal S51.

Figure 15:
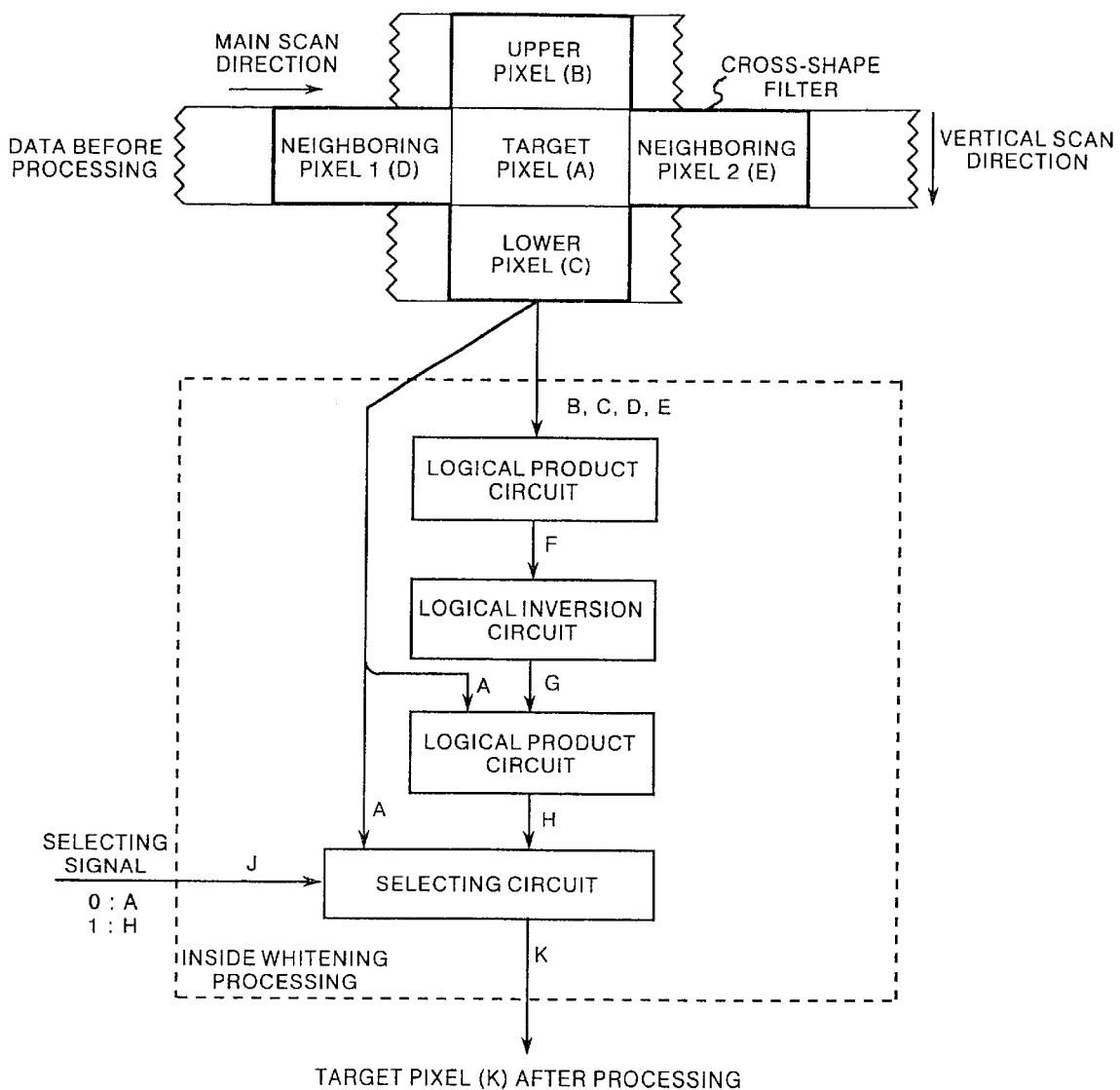
FIG. 15 is a diagram showing an algorithm of inside whitening processing.
Figure 17A:
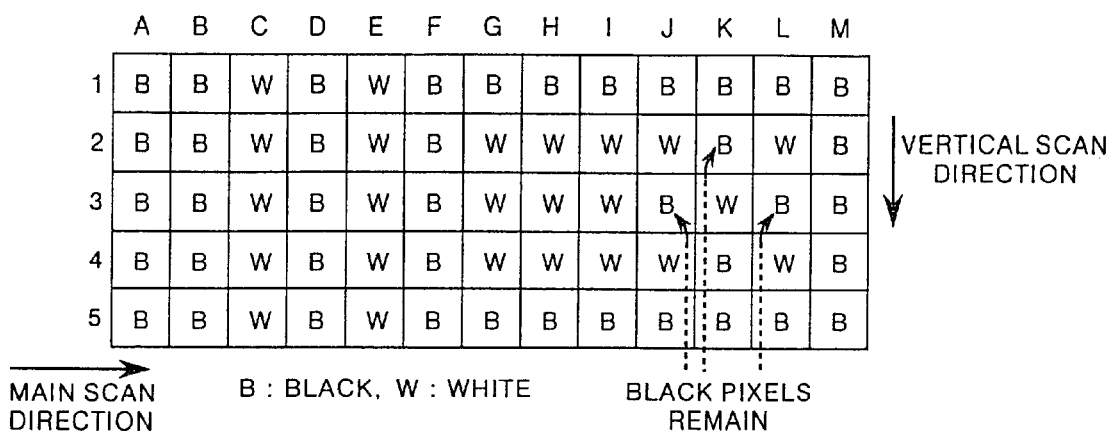
FIGS. 17 (A) and (B) are diagrams showing an example wherein data after MTF correction are binary converted and inside whitened thereafter.
Figure 17B:
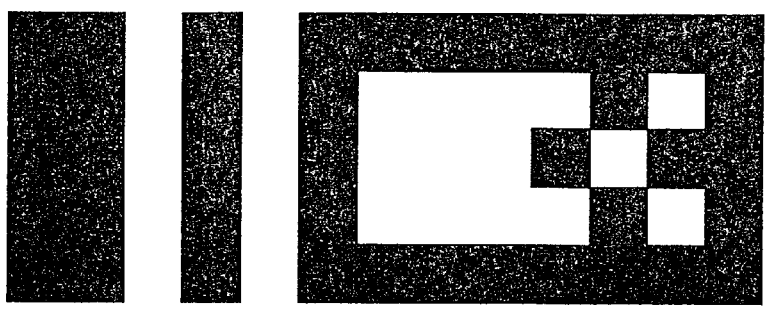
Figure 18A:
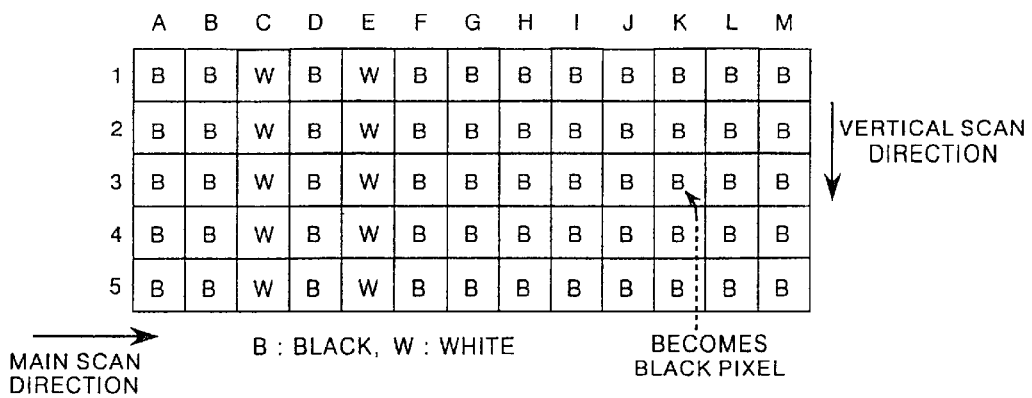
FIGS. 18 (A) to (C) are diagrams showing an example wherein data without MTF correction are binary converted and inverted thereafter.
Figure 18B:
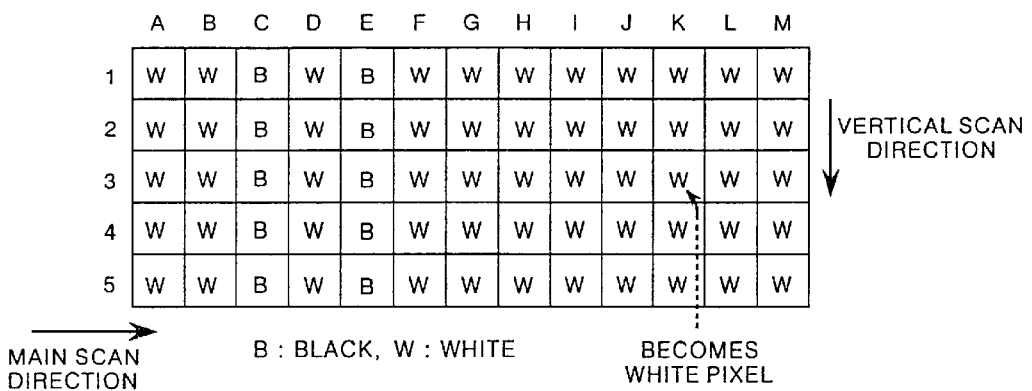
Figure 18C:
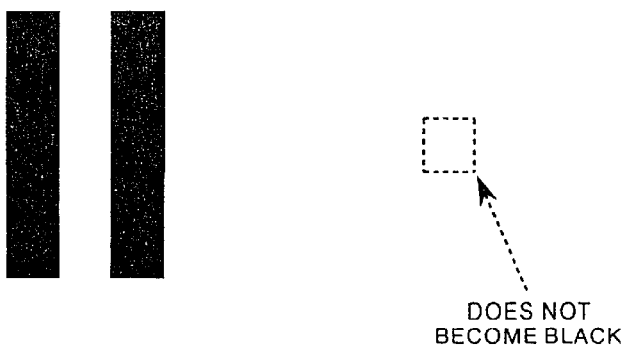

The inside whitening processing circuit 54 carries out the inside whitening processing shown in FIG. 15 based on the signals S40, S51 and S52, and outputs an inside whitened signal S54. In response to the content of the control signal S82 from the digitizer controlling CPU 82 in the digitizer unit 80, the inside whitening processing is carried out by the inside whitening processing circuit 54 according to the control signal S85 output from the modification processing controlling circuit 85 in synchronization with the synchronization signal S92. The signal in the line containing the upper pixel B in FIG. 15 is equivalent to the current line signal S40, the signal in the line containing the target pixel A and the neighboring pixels D and E is to the preceding line signal S51, and the signal in the line of the lower pixel C is to the signal S52 in the line before the preceding line. The selecting signal J is equivalent to the control signal S85 output from the modification processing controlling circuit 85 in the digitizer unit 80.

The inversion processing circuit 56 carries out the inversion processing shown in FIG. 12 and outputs an inverted signal S56. In response to the content of the control signal S82 from the digitizer controlling CPU 82 in the digitizer unit 80, the inversion processing is carried out by the inversion processing circuit 56 according to the control signal S86 output from the modification processing controlling circuit 85 in synchronization with the synchronization signal S92. The selecting signal C in FIG. 12 is equivalent to the control signal S86 output from the modification processing controlling circuit 85 in the digitizer unit 80.

Figure 7:
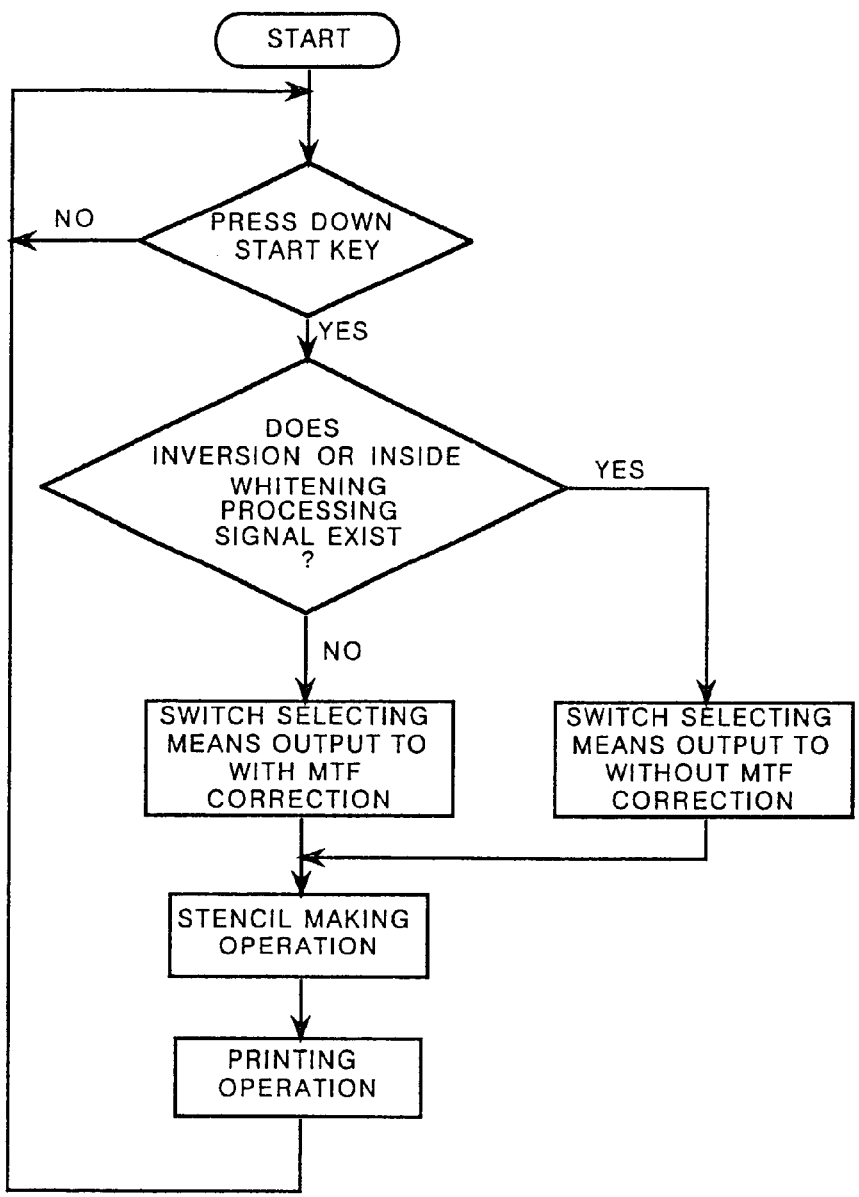
FIG. 7 is a flow chart showing a flow of processing by a controlling CPU in the first embodiment of the image processing apparatus.

FIG. 7 is a simple flow chart showing the flow of the processing by the controlling CPU 94 in the image processing apparatus having the above configuration. Hereinafter, the processing by the controlling CPU 94 will be explained briefly.

The controlling CPU 94 confirms that a start key in an operation panel (not shown in FIG. 1) has been pressed down. If the start key has not been pressed down, it waits until the key is pressed. After the start key has been pressed down, the controlling CPU confirms the control signal S83 expressing necessity of the inversion or inside whitening processing. If the control signal S83 is OFF, it means that no inversion or inside whitening processing is necessary. The controlling CPU 94 then outputs 1 to make the selecting signal S94 ON, and switches the selecting means 32 to "with MTF correction", and makes the selecting means 32 output the MTF corrected signal S20. On the other hand, if the control signal S83 is ON, it means that inversion or inside whitening processing is necessary. Therefore, the controlling CPU 94 outputs 0 to make the selecting signal S94 OFF, and switches the selecting means 32 to "without MTF correction" to make the selecting means 32 output the digital image signal S12.

After switching the selecting means 32, the controlling CPU 94 carries out stencil making operation or printing operation, and confirms the start key pressed down again.

According to the first embodiment of the image processing apparatus, when image modification processing such as inversion processing or inside whitening processing has been instructed and in the case where an area of image modification processing target has been specified, the MTF correction is weakened or canceled on the entire image signal before the image modification processing starts. Therefore, according to the image processing apparatus in the comparatively simple configuration, black dots (noise) will not appear in the area of inversion processing or inside whitening processing. When stencil making without inversion processing or inside whitening processing is carried out, processing by the digitizer except for inversion or inside whitening processing is carried out in parallel to image processing on a high resolution image with MTF correction.

Figure 8:
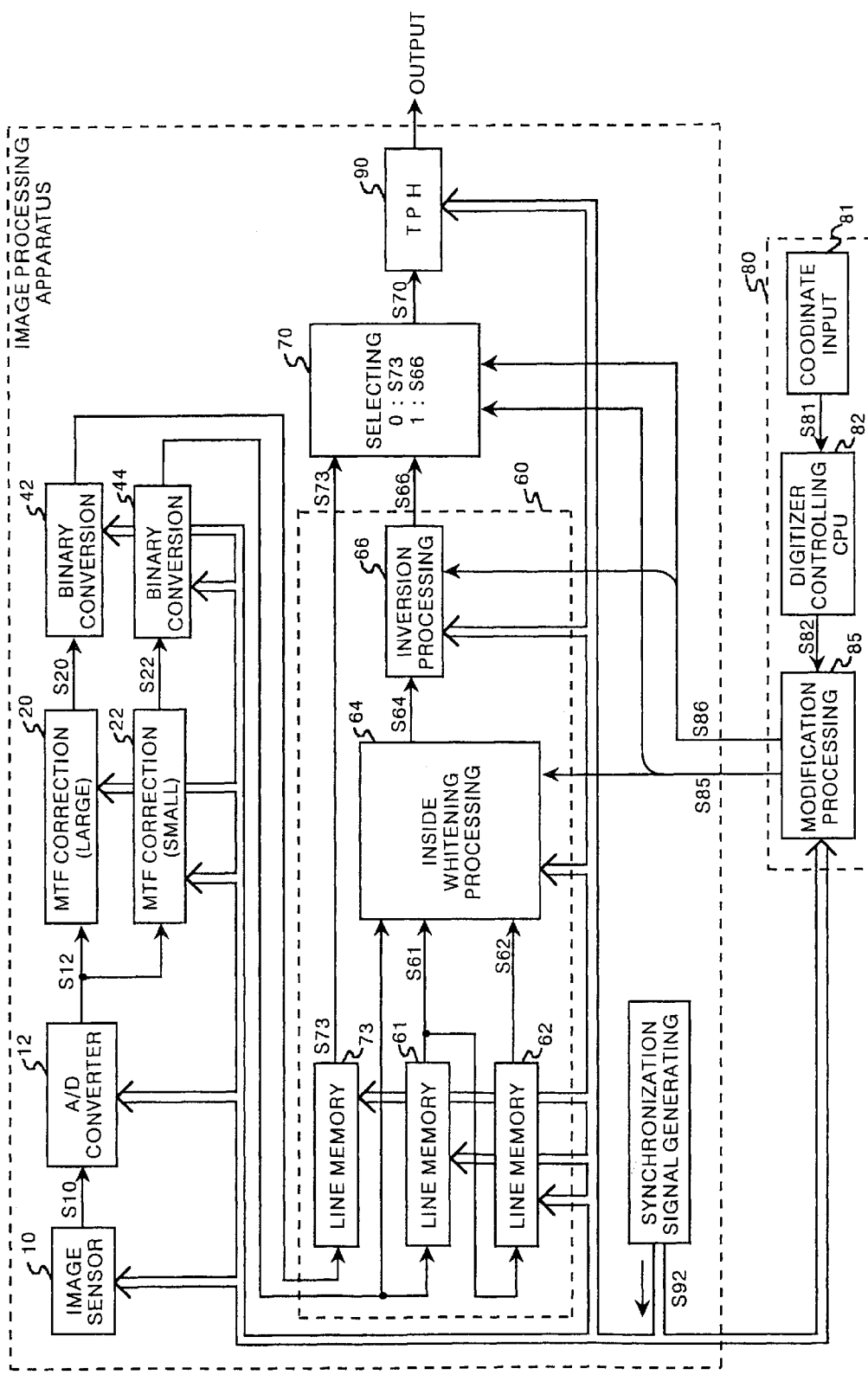
FIG. 8 is a block diagram showing a configuration of a second embodiment of an image processing apparatus related to the present invention.
Figure 9:
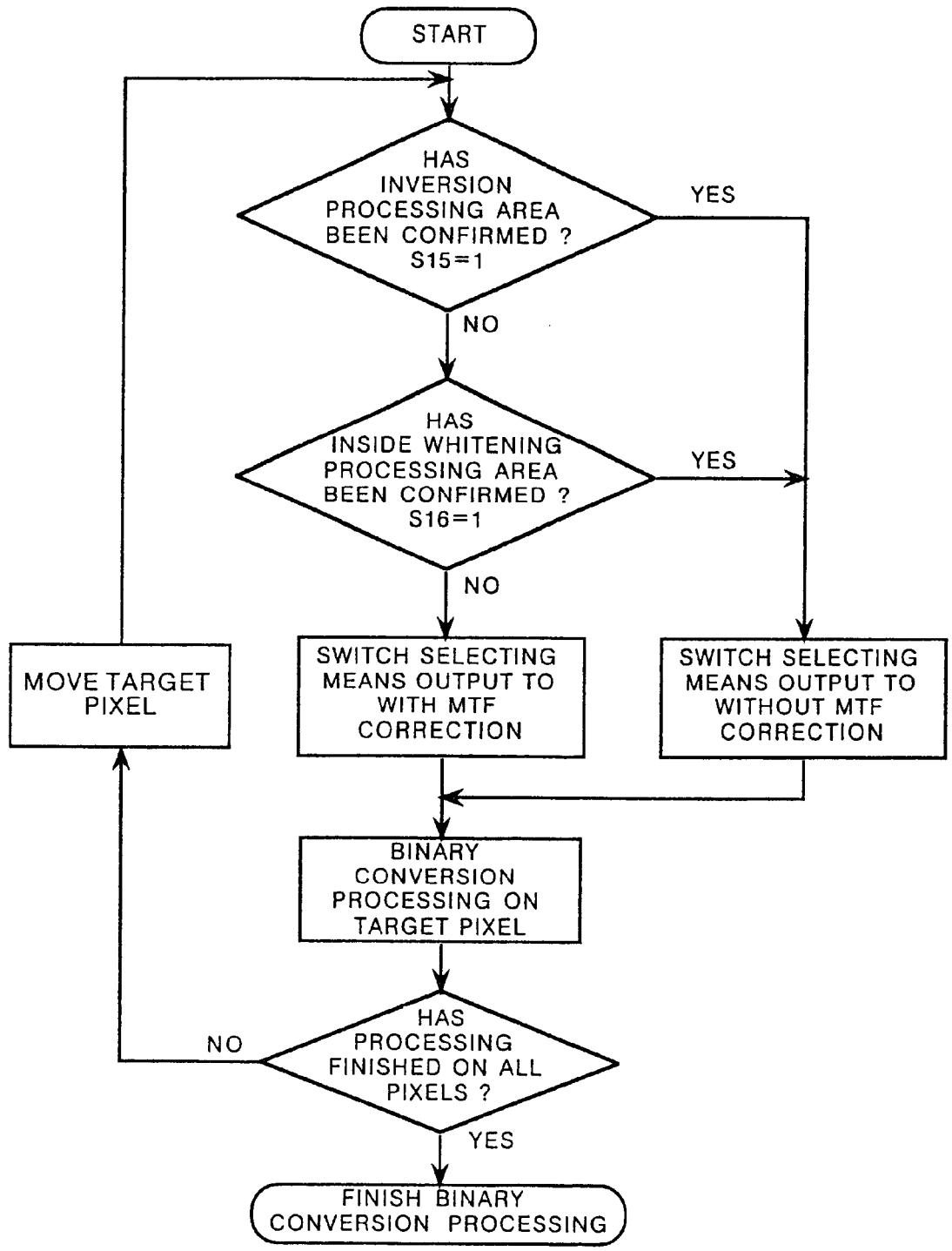
FIG. 9 is a flow chart showing an operational flow of selecting means in the second embodiment of the image processing apparatus.
Figure 14A:
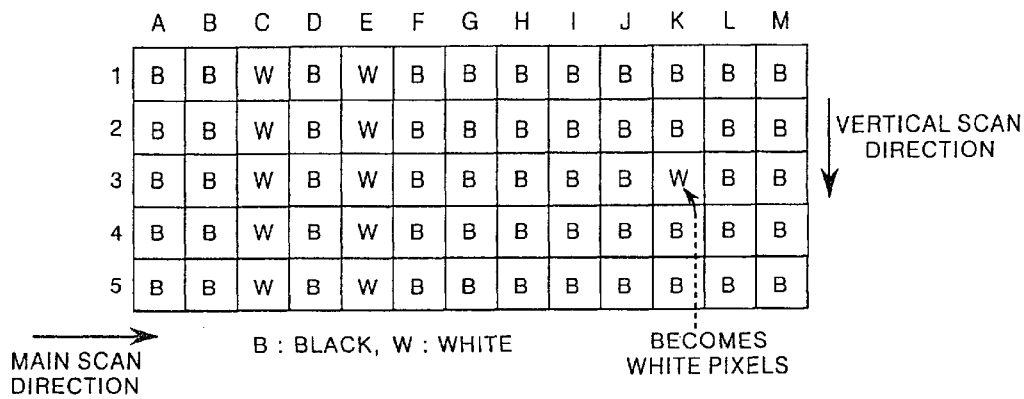
FIGS. 14 (A) to (C) are diagrams showing an example wherein data after MTF correction are binary converted and inverted thereafter.
Figure 14B:
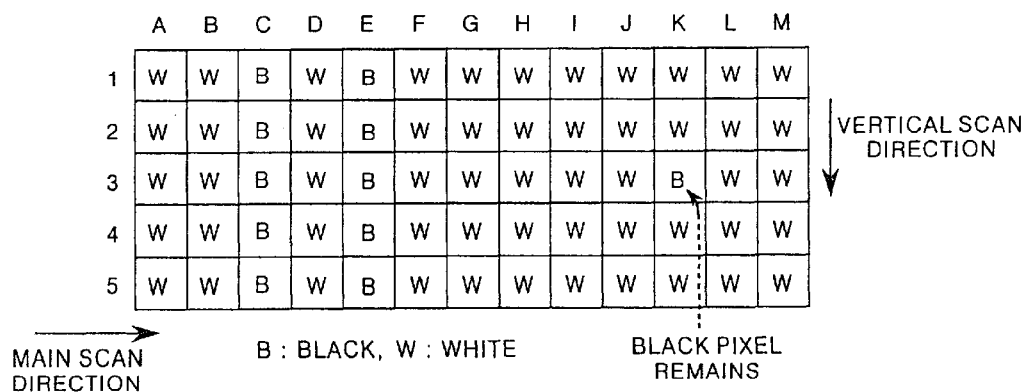
Figure 14C:
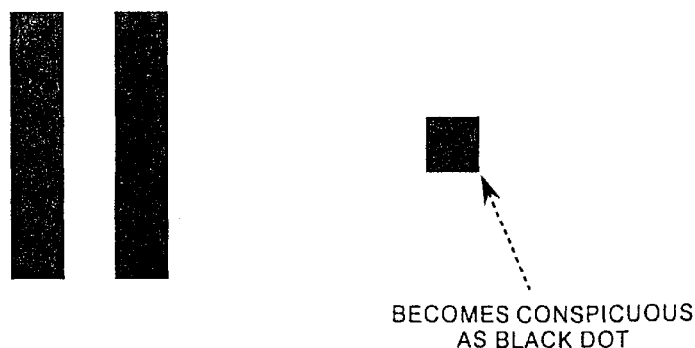

Referring to FIGS. 8 and 9, a second embodiment of the image processing apparatus related to the present invention will be explained next. In FIG. 8, elements the same as in FIG. 6 have the same indices and their explanation will be omitted here if unnecessary.

The image processing apparatus related to the second embodiment shown in FIG. 8 comprises binary conversion means 42 which carries out binary conversion on an MTF corrected signal S20 on which strong resolution correction has been carried out by MTF correction means 20, and binary conversion means 44 which carries out binary conversion on an MTF corrected signal S22 on which weak resolution correction has been carried out by MTF correction means 22. Image modification processing means 60 carries out inversion processing or inside whitening processing on a binary converted signal S44 from the binary conversion means 44. Selecting means 70 is placed as a step succeeding the image modification processing means 60. The image processing apparatus in the second embodiment is different from the first one in these points described above.

The image processing apparatus in the second embodiment adopts the configuration shown in FIG. 5. When stencil making including inversion processing or inside whitening processing is carried out, a signal on which weak MTF correction and image modification processing have been carried out is selected in response to an area on which the image modification processing such as inversion or inside whitening processing is carried out. When no image modification processing is carried out, a binary converted signal on which strong MTF correction has been carried out can be selected. By this configuration, same as the first embodiment, even in the same stencil, high resolution image with strong MTF correction (using a large correction amount) can be used for the area except for inversion or inside whitening processing area. Hereinafter, the configuration and operation of the image processing apparatus related to the second embodiment will be explained in detail.

The image modification processing means 60 comprises line memories 61 and 62 in the FIFO structure, an inside whitening processing circuit 64, and an inversion processing circuit 66.

The line memory 61 holds 1 line of the binary converted signal S44 with weak MTF correction (using a small correction amount). In synchronization with a synchronization signal S92 generated by a synchronization signal generating circuit 92 the line memory 61 outputs a preceding line signal S61 and inputs a current line signal S44. The preceding line signal S61 output from the line memory 61 is a line signal containing a target pixel. The line memory 62 holds a line of signal S61 which is preceding the line of the binary converted signal S44 with weak MTF correction. In synchronization with the synchronization signal S92 output from the synchronization signal generating circuit 92, the line memory 62 outputs a signal S62 in a line before the preceding line and inputs the preceding line signal S61.

As in the first embodiment of the image processing apparatus, the inside whitening processing circuit 64 carries out inside whitening processing shown in FIG. 15 using the signals S44, S61, and S62, and outputs an inside whitened signal S64. In response to the content of a control signal S82 from a digitizer controlling CPU 82 in a digitizer unit 80, the inside whitening processing circuit 64 carries out inside whitening processing according to a control signal S85 output from a modification processing controlling circuit 85 in synchronization with the synchronization signal S92. The current line signal S44 is equivalent to the signal in the line containing the upper pixel B in FIG. 15, the preceding line signal S61 to the line containing the target pixel A and the neighboring pixels D and E, and the signal S62 in the line before the preceding line is equivalent to the signal in the line containing the lower pixel C. The selecting signal J is corresponding to the control signal S85 output from the modification processing controlling circuit 85 in the digitizer unit 80.

The inversion processing circuit 66 carries out inversion processing shown in FIG. 12 on the inside whitened signal S64 and outputs an inverted signal S56. The inversion processing circuit 66 operates in the same manner as the inversion processing circuit 56 in the first embodiment of the image processing apparatus.

A line memory 73 in the FIFO structure holds a line of the binary converted signal S42 with strong MTF correction. In synchronization with the synchronization signal S92 from the synchronization signal generating circuit 92, the line memory 73 outputs a preceding line signal S73 while inputting the current line signal S42. The line memory 73 is used so that the signal S73 output from the line memory 73 is in the same phase in the horizontal direction as the preceding line signal S61 output from the line memory 61 which contains the target pixel (this phenomenon is called "synchronization of image signals").

The selecting means 70, as in the first embodiment of the image processing apparatus, selects either the signal S73 output from the line memory 73 or the signal S66 processed by the image modification processing means 60, based on the control signals S85 and S86 output from the modification processing controlling circuit 82. In the case where the control signals S85 and S86 are both OFF: 0, which means no inversion and no inside whitening processing, the selecting means 70 selects the signal S73 output from the line memory 73. In the case where the control signal S85 is ON: 1, which means the necessity of inside whitening processing, or in the case where the control signal S86 is ON: 1, which means the necessity of the inversion processing, the selecting means 70 selects the signal S66 processed by the image modification processing circuit 60. That is, the selecting means 70 selects the signal S66 when either the control signal S85 or S86 is ON. By carrying out such processing on the signal for the entire image (on all pixels) which is the target of the processing, binary conversion is finished. The flow of operation carried out by the selecting means 70 is shown simply in a flow chart in FIG. 9.

As has been described above, according to the second embodiment of the image processing apparatus, the signal with weak MTF correction is selected in response to the area specified for the image modification processing, when the image modification processing such as the inversion or inside whitening processing has been instructed. Therefore, the black noise problem due to the image modification processing on a signal with MTF correction will be solved and stencil making and printing can be carried out without generating black dots (noise) in the inverted or inside whitened area.

It is needless to say that not only weak MTF correction but no MTF correction, that is, the correction amount is 0, can be selected by the second embodiment of the image processing apparatus.

What is claimed is:

1. An image processing apparatus having resolution correction means which carries out resolution correction on an image to improve spatial resolution of an image, binary conversion means which carries out binary conversion on the image signal whose resolution has been corrected by the resolution correction means, and image modification processing means which carries out image modification processing based on a predetermined instruction to invert at least a portion of the image signal having been binary converted by the binary conversion means, wherein said processing apparatus comprises correction amount changing means which changes a correction amount of the resolution correction based on the predetermined instruction.

2. The image processing apparatus as claimed in claim 1 wherein the correction amount changing means comprises resolution correction means whose correction amount can vary.

3. The image processing apparatus as claimed in claim 1 wherein the correction amount changing means changes the correction amount for an image signal composing an entire image, based on the predetermined instruction.

4. The image processing apparatus as claimed in claim 1 wherein, based on the predetermined instruction, the correction amount changing means changes the correction amount only for a portion of an image signal instructed by the predetermined instruction.

5. The image processing apparatus as recited in claim 1, wherein said correction amount changing means changes a correction amount of the resolution correction to be smaller when the predetermined instruction indicates that said image modification processing has been carried out by said image modification processing means.

* * * * *